(12) United States Patent
Fishman et al.

(10) Patent No.: US 7,047,560 B2
(45) Date of Patent: May 16, 2006

(54) CREDENTIAL AUTHENTICATION FOR MOBILE USERS

(75) Inventors: Neil S. Fishman, Bothell, WA (US); Michael Kramer, Yonkers, NY (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 09/894,607

(22) Filed: Jun. 28, 2001

(65) Prior Publication Data

US 2003/0005290 A1   Jan. 2, 2003

(51) Int. Cl.
H04L 9/32 (2006.01)

(52) U.S. Cl. .............. 726/6; 726/8; 726/12; 713/156; 380/270

(58) Field of Classification Search ........ 713/156, 713/200; 726/6, 12–13; 380/270
See application file for complete search history.

(56) References Cited

U.S. PATENT DOCUMENTS

| | | | | |
|---|---|---|---|---|
| 5,241,594 A | * | 8/1993 | Kung | 713/151 |
| 5,511,122 A | * | 4/1996 | Atkinson | 713/153 |
| 5,586,260 A | * | 12/1996 | Hu | 713/201 |
| 5,822,518 A | * | 10/1998 | Ooki et al. | 713/201 |
| 5,875,296 A | * | 2/1999 | Shi et al. | 713/202 |
| 5,944,824 A | * | 8/1999 | He | 713/201 |
| 6,052,785 A | * | 4/2000 | Lin et al. | 713/201 |
| 6,061,650 A | * | 5/2000 | Malkin et al. | 704/228 |
| 6,067,623 A | * | 5/2000 | Blakley et al. | 713/201 |
| 6,070,244 A | * | 5/2000 | Orchier et al. | 713/201 |
| 6,092,196 A | * | 7/2000 | Reiche | 713/200 |
| 6,178,511 B1 | * | 1/2001 | Cohen et al. | 713/201 |
| 6,182,229 B1 | * | 1/2001 | Nielsen | 713/202 |
| 6,205,480 B1 | * | 3/2001 | Broadhurst et al. | 709/225 |
| 6,223,291 B1 | * | 4/2001 | Puhl et al. | 713/201 |
| 6,226,752 B1 | * | 5/2001 | Gupta et al. | 713/201 |
| 6,253,327 B1 | * | 6/2001 | Zhang et al. | 713/201 |
| 6,275,944 B1 | * | 8/2001 | Kao et al. | 713/202 |
| 6,282,575 B1 | * | 8/2001 | Lin et al. | 709/244 |
| 6,367,009 B1 | * | 4/2002 | Davis et al. | 713/166 |
| 6,421,768 B1 | * | 7/2002 | Purpura | 711/164 |

(Continued)

FOREIGN PATENT DOCUMENTS

WO   WO 00/22794   4/2000

(Continued)

OTHER PUBLICATIONS

Mark Hoogenboom, et al., "Security for Remote Access and Mobile Applications," *Computers & Security*, vol. 19, No. 2, Feb. 2000, pp. 149-163.

(Continued)

*Primary Examiner*—Ayaz Sheikh
*Assistant Examiner*—David García Cervetti
(74) *Attorney, Agent, or Firm*—Workman Nydegger

(57) ABSTRACT

Methods, systems, and computer program products for authenticating a mobile client that may have an input system optimized for numeric input. A mobile gateway receives authentication credentials from a mobile client and uses an authentication filter to map the authentication credentials according to pre-established criteria. The authentication filter may change the domain name, the username, or both. Then, the mapped authentication credentials are sent to a network that includes the content server being accessed. Any access privileges granted to the mobile client are based on the mapped authentication credentials. The mobile gateway may be configured to accept connections only from known servers. Mobile authentication credentials may be maintained in one or more domains, possibly having a trust relationship, or may be stored in a separately administered credential database.

36 Claims, 4 Drawing Sheets

U.S. PATENT DOCUMENTS

| | | | |
|---|---|---|---|
| 6,453,418 B1* | 9/2002 | Ooki et al. | 713/200 |
| 6,609,198 B1* | 8/2003 | Wood et al. | 713/155 |
| 6,715,080 B1* | 3/2004 | Starkovich et al. | 713/201 |
| 6,836,474 B1* | 12/2004 | Larsson et al. | 370/338 |
| 2001/0028636 A1* | 10/2001 | Skog et al. | 370/328 |
| 2004/0039906 A1* | 2/2004 | Oka et al. | 713/156 |

FOREIGN PATENT DOCUMENTS

| | | |
|---|---|---|
| WO | WO 00/46963 | 8/2000 |
| WO | WO 01/03402 | 1/2001 |

OTHER PUBLICATIONS

Luotonen, Ari, "Web Proxy Servers", 1997, pp. 54-59, 148-151, 338-341.

MacGregor, S. et al, "WWW.Security", 1996, pp. 9-10, 30-33, 47-64.

Franks, J. et al, W3C, HTTP Authentication: Basic and Digest Access Authentication, RFC 2617, 1999.

* cited by examiner

CREDENTIAL AUTHENTICATION FOR MOBILE USERS

BACKGROUND OF THE INVENTION

1. The Field of the Invention

The present invention relates to authentication credentials. More specifically, the present invention relates to methods, systems, and computer program products for authenticating a mobile client that may have an input system optimized for numeric input.

2. Background and Related Art

Content stored on networks often is protected for a number of reasons. For example, content may include proprietary technology that provides a business with a competitive advantage. Many employers consider at least some portion of their personnel information private or confidential. It may be important to protect certain vital content, such as customer orders, from corruption or loss. Whether the motivation is to insure confidentiality or privacy, to prevent the corruption or loss of content, or to secure sensitive information, access to computer networks usually is governed through authentication credentials, such as a username and password for a particular system or domain.

However, authentication credentials for a computer network may be compromised in a number of ways, including brute force attacks, monitoring network traffic, and gaining access to third-party systems that store authentication credentials. In a brute force attack, a large number of potential authentication credentials, perhaps all possible combinations, are submitted to a computer network. For example, a four-digit PIN (personal identification number) could be discovered by submitting the numbers from 0000 to 9999. Although submitting ten thousand numbers may seem like a significant task, for computers the imposition is minimal at best.

A common defense to brute force attacks is to increase the number of possibilities that must be submitted. Each added digit increases the number of potential selections by a factor of ten. If letters are available in addition to numbers, each character represents a factor of thirty-six. Including upper and lower case letter increases the weight of each character to sixty-two. For maximum protection, punctuation may be added to numbers and letters, arriving at a familiar one hundred and one possible choices for each character. (Typical English keyboards sold in the United States are described as 101 keyboards, indicating the number of printable characters that are supported.) Even if some characters are not allowed, with about one hundred options for each of four characters, the number of distinct combinations approaches 100 million, a significant improvement over the ten thousand combinations offered by a four-digit PIN.

Because arbitrary combinations of numbers, letters, and punctuation are difficult to remember, words, dates, acronyms, and the like, may help to keep authentication credentials familiar. Attackers exploit this weakness by employing a type of brute force attack, typically known as a dictionary attack. There is no need to try all combinations of letters or numbers; rather, only combinations that make sense as words, acronyms, or dates are submitted. Limiting the attack to a "dictionary" may reduce our 100 million improvement back to the range of ten or twenty thousand, and even less if only relatively common words are considered.

To reduce the threat posed by dictionary attacks, network administrators may impose policies regarding authentication credentials. For example, passwords may be required to include at least one upper case letter, at least one lower case letter, at least one number, and at least one punctuation character. In addition, a certain length may be mandated, such as five, six, seven, or eight characters. Because long passwords are more difficult to remember, specifying much more than eight characters may be counter productive because the passwords will be written down rather than memorized, allowing for authentication credentials to be compromised if the written password is ever discovered. For example, an all too common occurrence in a financial context is storing a PIN with its corresponding charge or debit card. Any value to the PIN is all but lost if the PIN must be written to be remembered. Similar issues exist in other environments, particularly regarding access to computer networks.

Recently, there has been an increasing demand for access to computer networks, and the content they may offer, using mobile clients. Due to their convenient size and utility, telephones are among of the most widely-used mobile clients. However, some mobile clients, such as telephones, have input systems that are optimized for numeric input. While letters and punctuation may be available, it is often quite cumbersome for most users to enter any characters other than numbers. As described above, allowing authentication credentials that only contain digits makes a computer network vulnerable to brute force attacks.

Furthermore, third parties may be involved in providing mobile access to content. For example, telephones may connect to a wireless application protocol ("WAP") server in reaching a desired network or content server. In many circumstances, the WAP server and the network will be entirely unrelated. Businesses may be unwilling or unable to bear the expense of offering mobile access to their network, whereas telephone carriers will be able to use WAP servers as a revenue stream through increased airtime.

Intermediate servers represent a security risk, because wireless protocols may not provide for secure end-to-end connections. Secure connections may be limited to each hop, such as a secure connection between a telephone and a WAP server, and a secure connection between the WAP server and the network being accessed. As a result, the WAP server will contain unencrypted content. For example, the telephone may enter authentication credentials that are encrypted during transit to the WAP server. The WAP server decrypts the authentication credentials and then re-encrypts the authentication credentials based on the secure protocol used in communicating with the network. If the WAP server is compromised, an attacker may be able to acquire authentication credentials that will allow access to any network that the mobile clients have accessed. Furthermore, to reduce the amount of information that must be remembered, mobile clients may use the same authentication credentials for other networks that do not provide mobile access, making those other networks vulnerable to attack as well.

Although it may be unlikely that an intermediate server will be compromised, the problem for the network is that the risk may be difficult to quantify. Security measures at the intermediate server are determined, implemented, monitored, and controlled, by whomever is responsible for the intermediate server. For some networks, the risk from numeric authentication credentials, coupled with uncertainty as to the extent of security provided by an intermediate server, will be too great, and mobile access will be prohibited.

SUMMARY OF THE INVENTION

These and other problems are overcome by the present invention, which is directed toward authentication based on relatively weak credentials, such as passwords with few characters or passwords with limited selections for each character. For example, one client may have an input system optimized for numeric input and therefore use numeric only passwords, whereas another client may user relatively short passwords. In general, the present invention may be used to map one set of authentication credentials to another set of authentication credentials. A gateway receives authentication credentials from the client and uses an authentication filter to map the authentication credentials according to pre-established criteria. The authentication filter may change the domain name, the username, or both. For example, one domain name may be substituted for another, or a suffix may be added to the username. Then the mapped authentication credentials are sent to the network that includes the content server being accessed. Any access privileges granted to the client are based on the mapped authentication credentials.

The gateway allows for authentication credentials that are specific to client access through the gateway, without disclosing information about the network to which clients connect. If a client's credentials are compromised, attempts to authenticate with the credentials that do not involve the gateway will fail because the specified domain name, username, or both, do not exist on the network. Furthermore, the gateway may be configured to accept connections only from known third party servers. As a result, any authentication credentials that may be discovered by an attacker are limited to use in a gateway context.

By defining authentication credentials that are specific to client access through the gateway, network administrators are able to balance an appropriate level of access permissions with the increased level of risk that results from weak credentials, such as numeric passwords. Rather than granting the same level of access that a user would enjoy using other authentication credentials, such as when authenticating with an office computer over an internal network connection, gateway authentication credentials can be restricted to insure minimal exposure if compromised. For example, gateway authentication credentials may be limited to the network resources of a single user, such as the user's email account, a default login directory, etc., whereas other authentication credentials might allow the user access to a large number of network resources that are ordinarily shared among a number of users, including servers, directories, databases, etc.

The gateway also facilitates management of gateway authentication credentials. The domain names and/or usernames may be updated without imposing hardship on the clients. For example, if it appears that a domain has been compromised, a new domain may be created or new accounts in a domain may be created and the gateway configured accordingly. Gateway authentication credentials may be associated with other authentication credentials to identify potential resources that clients may access, with specific access permissions granted as appropriate. In other words, gateway authentication credentials would not grant permissions greater than those provided for in the other authentication credentials.

A trust relationship may be established between various authentication credentials and corresponding domains. The trust relationship defines specific areas of trust. For example, one domain may trust the authentication credentials in another domain for delegate access privileges, but not for other, more sensitive privileges, such as administrator privileges. Defining a trust relationship offers an additional level of control over mobile access privileges because it prevents mobile authentication credentials from superceding other authentication qualifications.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE INVENTION

Figure 1:
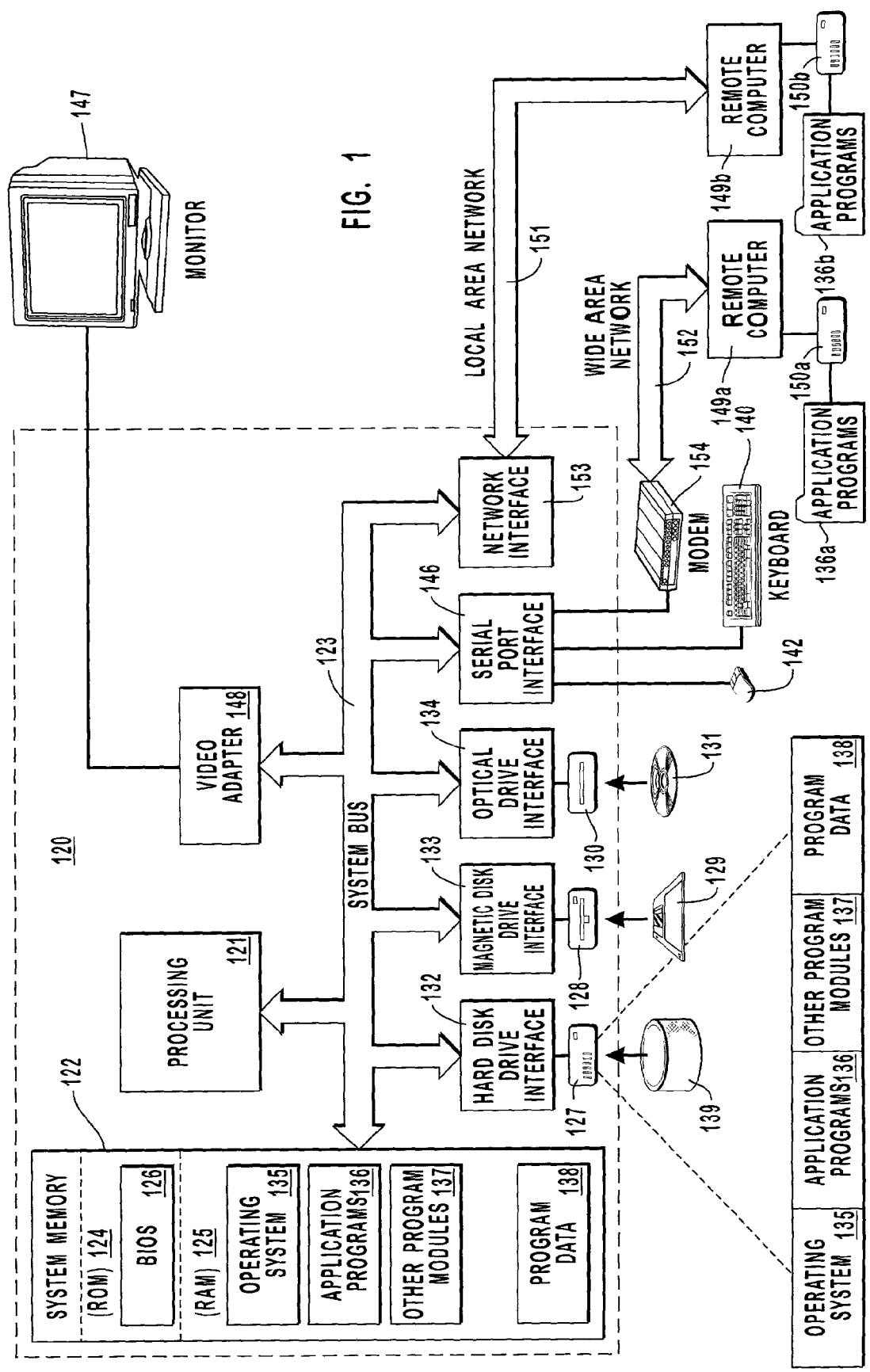
FIG. 1 illustrates an exemplary system that provides a suitable operating environment for the present invention.

The present invention extends to methods, systems, and computer program products for authenticating clients. A gateway maps authentication credentials received from a client and sends the mapped authentication credentials to a network that includes the resources the client desires to access. Authentication credentials identify a particular client and determine the resources the client is authorized to access, including the types of access permitted.

Authentication credentials often include a username and password for one or more domains. Other types of information, including biometric attributes (e.g., fingerprints) and hardware keys (e.g., smartcards), may be used as well. The present invention is not limited to any particular type of authentication credentials. Authentication credentials ordinarily apply to a group or collection of one or more resources, often referred to as a domain. Domains facilitate resource administration by allowing resources to be managed as a single unit, with common rules and procedures. More generally, the term "domain" describes a logical grouping of resources, wherein the grouping may be independent of how resources are interconnected. A single network may have one or more domains and a single domain may include one or more networks.

At times, authentication credentials may be described as weak or short. As used in this application, however, weak and short should be interpreted as a comparative, rather than absolute, terms. Weak and/or short authentication credentials are weak and/or short only in that stronger and/or longer authentication credentials are possible and may be desirable. For example, a four-digit password is weak and short in comparison to a five-digit password. Similarly, a five-digit password is weak, although not short, in comparison to a five-character alphanumeric password. In its most general sense, the present invention involves substituting one set of authentication credentials for another. The specific examples discussed below merely identify exemplary environments or embodiments for practicing the present invention and should not be interpreted as necessarily limiting its scope.

The term "client" may be used to describe individuals, devices, computers, systems, etc., either alone or in combination, that access computer resources. The term "server" describes a provider of computer resources, and likewise includes devices, computers, systems, etc. Depending on the circumstances, a server in one setting may be a client in another, and likewise, a client in one setting may be a server at other times. The term network describes interconnected resources, and encompasses a wide range of configurations, including a single resource, such as a computer, storage system, printer, file server, etc., that allows connections with clients and/or any other resource.

Each of the foregoing terms should be accorded the widest possible interpretation. Those of skill in the art may recognize that, in a particular context, certain terms may acquire a more specific or alternate meaning. It should be noted, therefore, that the following detailed description is offered to present exemplary implementations and is not intended to limit the scope of the present invention. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM (random access memory), ROM (read-only memory), EEPROM (electrically erasable programmable read-only memory), CD-ROM (compact disk read-only memory) or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 124. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer (PC), a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
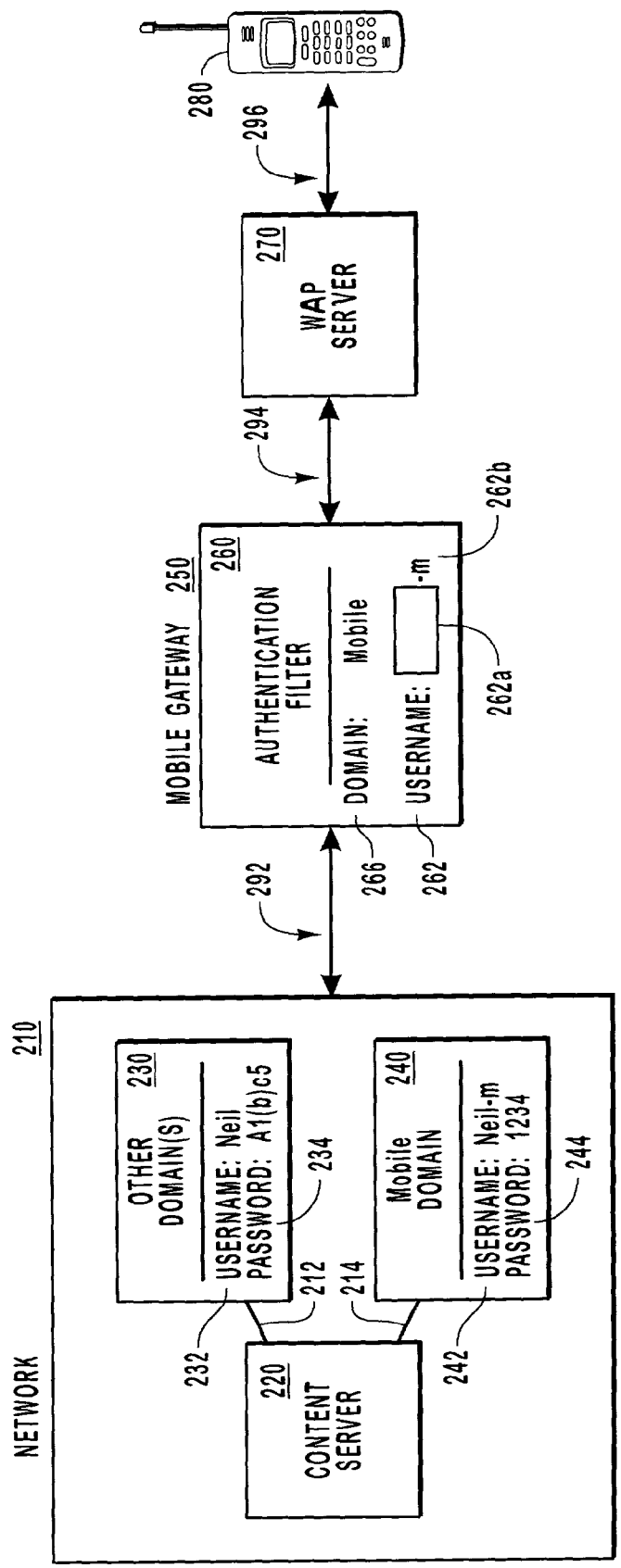
FIG. 2 is a block diagram showing a network with separate domains for mobile and other authentication credentials.

The block diagram of FIG. 2 shows network 210 with separate domains, mobile domain 240 and other domain(s) 230, for managing mobile and other authentication credentials, respectively. Mobile domain 240 may be recognized generally by network 210 or may be used only in providing access to content server 220. Other domain(s) 230 includes username 232, identifying Neil as a user, with a password 234 of A1(b)c5. (Note that the use of upper and lower case characters, numbers, and punctuation, provides a significant defense against brute force attacks.) Mobile domain 240 includes username 242, identifying Neil-m as a user, with a numeric password 244 of 1234. As indicated by references 212 and 214, both Neil and Neil-m have access permissions for content server 220.

Because mobile domain 240 is separate from other domain(s) 230, it is not necessary for username 242 and username 232 to be different. Either separate usernames or separate domain names is sufficient for providing authentication credentials that are specific to a mobile client. In practice, administration of the two domains may be simplified if usernames are shared. For example, a trust relationship may be established between the two domains. The extent of the trust relationship between the domains depends on the circumstances of a particular implementation, but the mobile domains would be trusted with respect to some minimal level of access permissions, such as delegate permissions in an email context. The different usernames, however, aid below in distinguishing between comments referring to other domain(s) 230 and comments that refer to mobile domain 240. The distinct usernames, Neil and Neil-m, therefore, will be retained throughout the remaining discussion of FIG. 2 for the sake of clarity. Note that FIG. 3 focuses attention on the use of a single domain with different usernames.

To account for the increased risk associated with mobile clients, the access permissions granted through mobile domain 240 are limited as compared to those granted by other domain(s) 230. For example, if content server 220 provides email resources, Neil may have all access rights for a particular email account, whereas Neil-m may be granted only certain delegate access privileges. Furthermore, Neil also may have access privileges to other resources that are part of other domain(s) 230, whereas Neil-m's access privileges extend only to content server 220.

Access privileges may apply to one or multiple clients. For example, the owner or administrator of a resource may have one set of access privileges, certain groupings or domains may have another set of access privileges, and all others may have a default set of access privileges. Those of skill in the art will recognize that a variety of schemes for specifying access privileges exist and that others may be developed in the future. It should be noted that the present invention is not limited to any particular form of access privileges. Rather, the present invention recognizes that it may be desirable to provide separate access privileges for mobile clients, and provides the relevant technology for doing so, independent of the underlying implementation access privileges.

If the authentication credentials associated with Neil-m were compromised, only the resources available to a single mobile client would be accessible. For email resources, this probably will include only the mobile client's mailbox. In contrast, compromising the authentication credentials associated with Neil, are likely to yield much wider access privileges to resources of network 210 that are probably shared by various clients.

Alternatively mobile domain 240 may be a separately administered credential database that is only used in providing access to content server 220. In this case, mobile domain 240 is not a domain in the same sense that other domain(s) 230 is a domain. The separately administered credential database could not be used for direct access of resources that are part of network 210. Rather, content server 220 may be configured to verify authentication credentials included within this credential database. Once verified, a shared account in a domain, such as other domain(s) 230, would be used in accessing content server 220. As above, if the authentication credentials for Neil-m were compromised, only the resources available to a single mobile client would be at risk, such as the client's mailbox. However, if the shared account were compromised, resources associated with all mobile clients would be at risk.

Turning now to the flow of authentication credentials from any of various mobile clients to network 210, phone 280 provides authentication credentials to WAP server 270 over connection 296. Although a textual username (Neil) is shown in FIG. 2, the username is ordinarily stored at the phone so it does not need to be entered each time a request for content is made. Connection 296 may be encrypted, using a protocol such as wireless transport layer security ("WTLS"), to protect content exchanged between phone 280 and WAP server 270. WAP server 270 decrypts the authentication credentials and sends them to mobile gateway 250 over connection 294. Like connection 296, connection 294 may encrypt the authentication credentials using a protocol such as secure sockets layer ("SSL"). Typically, WAP server 270 operates as a protocol translator between the wireless protocols of mobile clients and the wireline protocols used in communicating with mobile gateway 250. The authentication credentials are subject to attack at the WAP server because, at least for a time, they are unencrypted. Furthermore, because the authentication credentials are likely to include relative short numeric portions, such as a numeric password or PIN, the authentication credentials are vulnerable to brute force attacks.

Mobile gateway 250 includes an authentication filter 260 that is used in mapping received authentication credentials. Authentication filter 260 includes two components, domain identifier 266 and username modifier 262. The domain identifier 266 specifies the domain that network 210 will use in processing authentication credentials. In FIG. 2, the domain identifier is Mobile. Changing a domain name in accordance with domain identifier 266 includes substituting one domain for another (replacing a domain specified by a mobile client with domain identifier 266), altering a domain name (making a change to a domain specified by a mobile client), and adding a domain where none was specified (adding domain identifier 266 where a mobile client did not specify a domain), etc. The username modifier 262 includes a username box 262*a* and a suffix 262*b*. Username box 262*a* is simply a placeholder for all usernames, whereas the mobile gateway adds suffix 262*b* to usernames. Mobile gateway 250 sends network 210 mapped authentication credentials over connection 292, using encryption as appropriate.

Network 210 processes the authentication credentials it receives as described above. Note that mobile gateway 250 identifies both a separate mobile domain 240 and adds a username suffix. If the username Neil, and password 1234 are entered at phone 280, mobile gateway changes the username to Neil-m and sends the authentication credentials to mobile domain 240 for processing. Because a username Neil-m, with a password of 1234, exists in mobile domain 240, phone 280 will be granted the access privileges that are associated with Neil-m. Ordinarily, only a separate mobile domain, such as mobile domain 240, or a username suffix is needed to provide authentication credentials that are specific to a mobile client.

Figure 3:
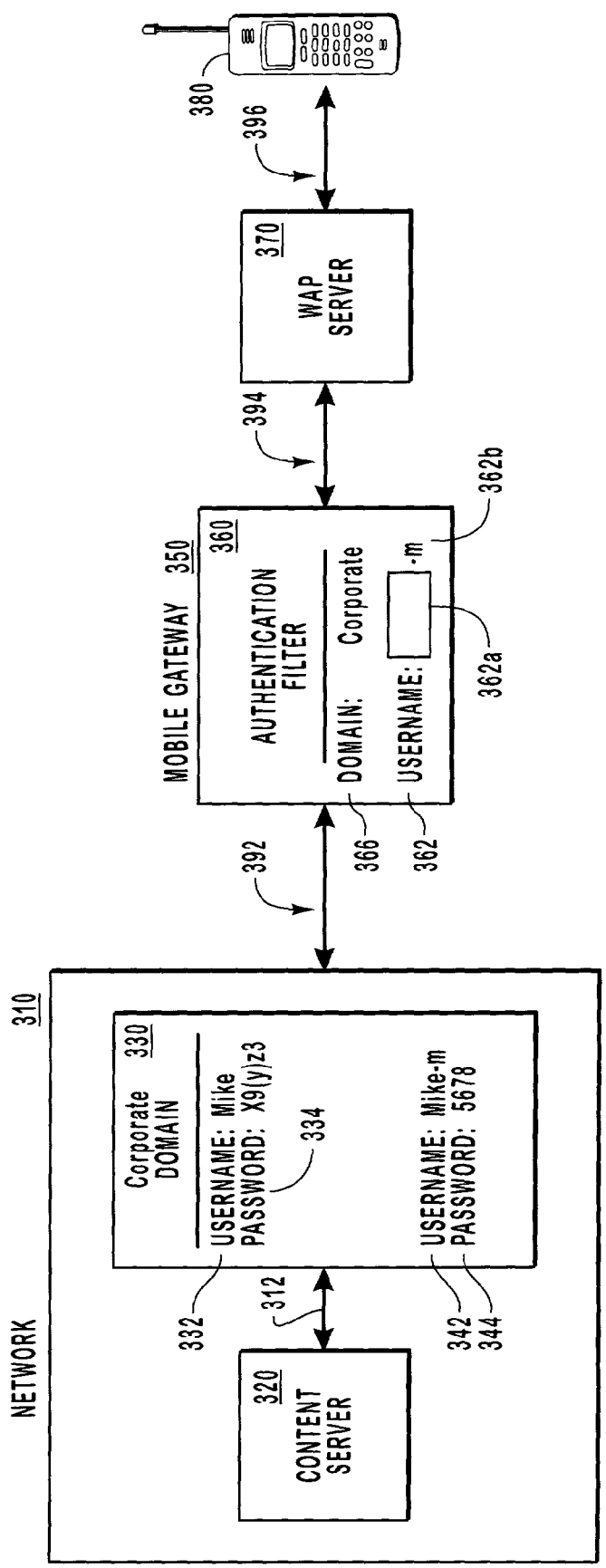
FIG. 3 is a block diagram showing a network with a single domain for mobile and other authentication credentials.

The block diagram of FIG. 3 shows a network with a single domain, corporate domain 330, for both mobile and other authentication credentials. A username 332 of Mike with a password 334 of X9(y)z3 is defined in corporate domain 330 for determining access privileges to the resources, such as content server 320, of network 310. A mobile client, with a username 342 of Mike-m and a password 344 of 5678 is also defined in corporate domain 330. Note that the present invention does not require that any particular suffix be added to usernames. Furthermore, the present invention does not necessarily require changing usernames by adding a suffix. Usernames may be changed by adding a prefix, inserting characters into the middle of a username, substituting all or a portion of a username for another portion or username, deleting characters from a username, etc.

Similar to the description with reference to FIG. 2, and turning now to the flow of authentication credentials from any of various mobile clients to network 310, phone 380 provides authentication credentials to WAP server 370 over connection 396, using WTLS. WAP server 370 decrypts the authentication credentials received over connection 396 and re-encrypts the authentication credentials for SSL connection 394. At mobile gateway 350, authentication filter 360 adds suffix 362*b* to usernames 362*a,* as indicated by reference 362. Mobile gateway 350 sets the applicable domain 366 for the received authentication credentials to Corporate.

If the username Mike, and password 5678 are entered at phone 380, mobile gateway changes the username to Mike-m and sends the authentication credentials to corporate domain 330 for processing. Because a username Mike-m, with a password of 5678, exists in corporate domain 330, phone 380 will be granted the access privileges that are associated with Mike-m. Here, only a single domain, such as corporate domain 330, is needed to provide authentication credentials that are specific to a mobile client.

One drawback to the single domain implementation is that policies and procedures for authentication credentials are often set on a domain basis. That is, corporate domain 330 may be set to require at least one upper case letter, at least one lower case letter, a number, and a punctuation character, in all passwords. By having Mike-m in corporate domain 330, password 344 would be subject to these requirements, and therefore, an all-numeric password, such as 5678, may not be allowed.

It should also be noted that authentication filter 360 is capable of making whatever changes to authentication credentials that are appropriate for the type and format of authentication credentials implemented by network 310, content server 320, and/or corporate domain 330. As reference 312 shows, content server 320 depends on corporate domain 330 for determining access privileges. A particular implementation of authentication credentials, however, is not necessarily limited by the present invention. Any changes that mobile gateway 350 makes need only be proper for the authentication credentials that are expected by network 310, content server 320, and/or corporate domain 330. Where a separately administered authentication credential database provides access to resources, the mapping performed by a mobile gateway may be specific to the separate credential database, even though those mappings would not be appropriate for network 310 or any associated domains.

Figure 4:
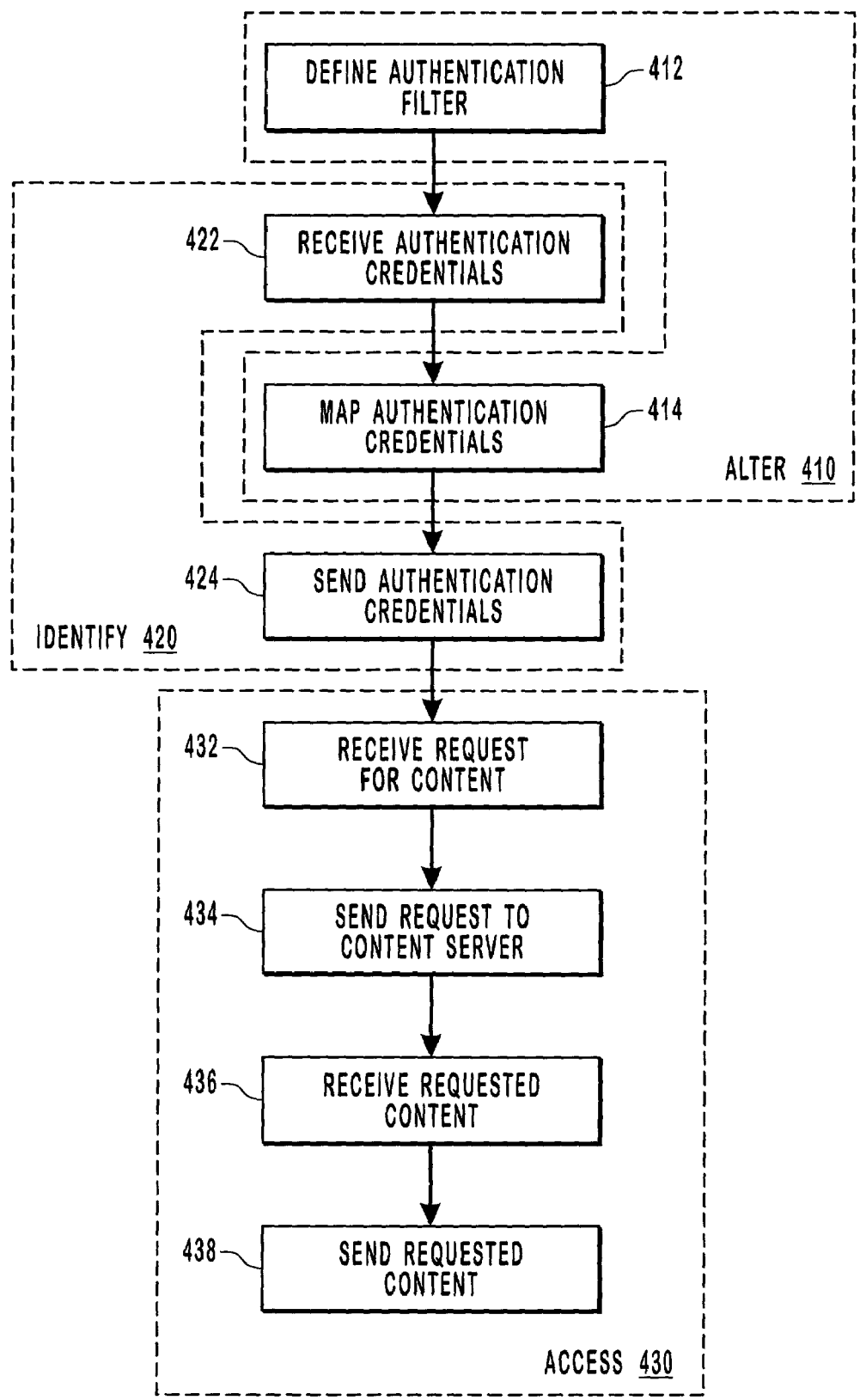
FIG. 4 illustrates an exemplary method for authenticating a mobile client through a mobile gateway.

Turning now to FIG. 4, an exemplary method for authenticating a mobile client through a mobile gateway is illustrated. A step for altering (410) authentication credentials may include the acts of defining (412) an authentication filter and mapping (414) any received authentication credentials. Mapping may include changing the domain name, username, or otherwise modifying the authentication credentials. One domain name may be substituted for another and usernames may have a suffix added.

A step for identifying (420) a mobile client may include the acts of receiving (422) authentication credentials from a mobile client and sending (424) the mapped authentication credentials to a network providing the resources that will be requested by the mobile client. The steps of altering (410) authentication credentials and identify (420) a mobile client are intertwined to indicate that the acts associated with the steps are not necessarily performed in any particular order. A step for accessing (430) content provided by the network may include the acts of receiving (432) a request for content, sending (434) the request to the network, receiving (436) the requested content, and sending (438) the requested content to the mobile client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computerized system that includes one or more wireless clients accessing a content server through a WAP server and a gateway interposed between the WAP server and the content server, all of which are part of a network, wherein access to the content server requires authentication credentials, the network maintaining gateway authentication credentials that specify one or more access privileges tailored to access through the gateway, a method of authenticating a client comprising a gateway performing the acts of:

defining an authentication filter in a gateway that is remotely interposed between a remote WAP server client and a content server, wherein the authentication filter maps authentication credentials received from the remote WAP server client according to pre-established criteria, the authentication filter including a domain identifier and a username modifier, wherein the WAP server provides the authentication credentials to the gateway in response to a wireless client requesting access to a domain available to the content server;

receiving the authentication credentials at the gateway from the remote WAP server client, wherein the authentication credentials include both a password and a user name corresponding to access permissions for accessing the resources at the content server through one or more domains;

mapping the received authentication credentials based on the pre-established criteria, and by changing at least one of a domain and user name of the authentication credentials received from the remote client to different domain or user name, respectively, wherein the domain identifier is configured to change the domain, and wherein the username modifier is configured to change the user name that is received from the remote client by at least one of adding a suffix or prefix to the user name, adding new characters to a middle portion of the user name, replacing a portion of the user name, or deleting some characters from the user name; and sending the mapped authentication credentials to the network, the mapped authentication credentials including the password originally provided by the WAP server client and the at least one changed user name or domain, and such that the wireless client's access to the content source is based on the mapped authentication credentials comprising the at least one of a changed user name and a changed domain.

2. A method as recited in claim 1 wherein gateway authentication credentials and other authentication credentials are maintained in separate domains, and wherein the act of mapping the received authentication credentials includes changing a domain name that is part of the received authentication credentials.

3. A method as recited in claim 2 wherein the act of mapping the received authentication credentials includes replacing the domain name that is part of the received authentication credentials with another domain name.

4. A method as recited in claim 1 wherein the gateway authentication credentials are maintained in a credential database that is administered separately from domain authentication credentials and recognized by the content server only in authenticating client access through the gateway.

5. A method as recited in claim 1 wherein gateway authentication credentials and other authentication credentials share a common domain, and wherein the act of mapping the received authentication credentials includes changing a username that is part of the received authentication credentials.

6. A method as recited in claim 5 wherein the act of mapping the received authentication credentials includes adding a suffix to the username.

7. A method as recited in claim 5 wherein the act of mapping the received authentication credentials includes adding a prefix to the username.

8. A method as recited in claim 1 wherein the client includes one or more identified wireless application protocol servers providing gateway and content server access to one or more other clients, the method further comprising the act of accepting authentication credentials only from the one or more identified wireless application protocol servers.

9. A method as recited in claim 1 wherein the gateway authentication credentials correspond to other authentication credentials that allow access to a content server, and wherein a trust relationship exists between the gateway authentication credentials and other authentication credentials with respect to one or more access privileges, the method further comprising the acts of:

receiving a request for content available at the content server;

sending the request to the network;

receiving the requested content from the network; and sending the received content to the client.

10. A method as recited in claim 9 wherein the content available at the content server comprises email content.

11. A method as recited in claim 9 wherein the one or more access privileges included within the trust relationship that exists between the gateway authentication credentials and the other authentication credentials comprise a delegate access permission.

12. In a computerized system that includes one or more mobile clients accessing a content server through a mobile gateway and a WAP server interposed between the WAP server and the content server, all of which are part of a network, wherein access to the content server requires authentication credentials that may contain a combination of numbers, upper case letters, lower case letters, and punctuation, the network maintaining mobile authentication credentials that specify one or more access privileges tailored to mobile client access, a method of authenticating a mobile client comprising a mobile gateway performing steps for:

altering, at a gateway, authentication credentials that are received from a WAP server communicating with one or more remote mobile clients and the gateway to produce mapped authentication credentials that match mobile authentication credentials maintained on the network by at least one of changing the domain name and the user name, wherein the authentication credentials include a password and user name for resources at one or more domains of the content server, which are provided by a wireless client to the WAP server and from the WAP server to the gateway, and wherein changing the user name includes one of adding a suffix or prefix to the user name, adding new characters to a middle portion of the user name, replacing a portion of the user name, or deleting some characters from the user name;

identifying a mobile client to the network using the altered authentication credentials, including the password provided by the wireless client and at least one of a changed domain or user name; and accessing content provided by the network in accordance with the access privileges allowed by the mobile authentication credentials.

13. A method as recited in claim 12 wherein the step for altering authentication credentials comprises the acts of:

defining an authentication filter that maps authentication credentials received from mobile clients according to pre-established criteria; and mapping the received authentication credentials based on the pre-established criteria.

14. A method as recited in claim 12 wherein the step for identifying a mobile client comprises the acts of:

receiving authentication credentials from a mobile client; and sending mapped authentication credentials to the network, wherein the mobile client's access to the content source is determined from the mapped authentication credentials.

15. A method as recited in claim 12 wherein changing at least one of the domain name and a username includes either adding a suffix to the username or replacing the domain name with another domain name.

16. A method as recited in claim 12 wherein the mobile authentication credentials are maintained in a credential database that is administered separately from domain authentication credentials and recognized by the content server only in authenticating mobile clients.

17. A method as recited in claim 12 wherein mobile authentication credentials and other authentication credentials share a common domain.

18. A method as recited in claim 12 wherein the mobile client includes one or more identified wireless application protocol servers providing mobile gateway and content server access to one or more other mobile clients, the step for identifying a mobile client comprising the act of accepting authentication credentials only from the one or more identified wireless application protocol servers.

19. A method as recited in claim 12 wherein the step for accessing content provided by the content server comprises the acts of:

receiving a request to access content from the mobile client;

sending the request to the network;

receiving the requested content from the network; and sending the received content to the mobile client.

20. A method as recited in claim 19 wherein the content is email content.

21. A method as recited in claim 12 wherein a trust relationship exists between the mobile authentication credentials and other authentication credentials with respect to one or more access privileges.

22. A method as recited in claim 21 wherein the one or more access privileges included within the trust relationship that exists between the mobile authentication credentials and the other authentication credentials comprise a delegate access permission.

23. In a computerized system that includes one or more mobile clients accessing a content server through a WAP server and a mobile gateway interposed between the WAP server and the content server, all of which are part of a network, wherein access to the content server requires authentication credentials that may contain a combination of numbers, upper case letters, lower case letters, and punctuation, the network maintaining mobile authentication credentials that specify one or more access privileges tailored to mobile client access, a computer program product that implements a method of authenticating a mobile client comprising:

a computer readable medium for carrying machine-executable instructions for implementing the method; and wherein said method is comprised of machine-executable instructions for a mobile gateway performing the acts of:

defining an authentication filter in a gateway that is remotely interposed between a remote WAP server client and a content server, wherein the authentication filter maps authentication credentials received from the remote WAP server client according to pre-established criteria, the authentication filter including a domain identifier and a username modifier, wherein the WAP server provides the authentication credentials to the gateway in response to a wireless client requesting access to a domain available to the content server;

receiving the authentication credentials at the gateway from the remote WAP server client, wherein the authentication credentials include both a password and a user name corresponding to access permissions for accessing the resources at the content server through one or more domains;

mapping the received authentication credentials based on the pre-established criteria, and by changing at least one of a domain and user name of the authentication credentials received from the remote client to different domain or user name, respectively, wherein the domain identifier is configured to change the domain, and wherein the username modifier is configured to change the user name that is received from the remote client by at least one of adding a suffix or prefix to the user name, adding new characters to a middle portion of the user name, replacing a portion of the user name, or deleting some characters from the user name; and sending the mapped authentication credentials to the network, the mapped authentication credentials including the password originally provided by the WAP server client and the at least one changed user name or domain, and such that the wireless client's access to the content source is based on the mapped authentication credentials comprising the at least one of a changed user name and a changed domain.

24. A computer program product as recited in claim 23 wherein mobile authentication credentials and other authentication credentials are maintained in separate domains, and wherein the act of mapping the received authentication credentials includes changing a domain name that is part of the received authentication credentials.

25. A computer program product as recited in claim 24 wherein the act of mapping the received authentication credentials includes replacing the domain name that is part of the received authentication credentials with another domain name.

26. A computer program product as recited in claim 23 wherein the mobile authentication credentials are maintained in a credential database that is administered separately from domain authentication credentials and recognized by the content server only in authenticating mobile clients.

27. A computer program product as recited in claim 23 wherein mobile authentication credentials and other authentication credentials share a common domain, and wherein the act of mapping the received authentication credentials includes changing a username that is part of the received authentication credentials.

28. A computer program product as recited in claim 27 wherein the act of mapping the received authentication credentials includes adding a suffix to the username.

29. A computer program product as recited in claim 27 wherein the act of mapping the received authentication credentials includes adding a prefix to the username.

30. A computer program product as recited in claim 23 wherein the mobile authentication credentials correspond to other authentication credentials that allow access to a content server, and wherein a trust relationship exists between the mobile authentication credentials and other authentication credentials with respect to one or more access privileges, the method further comprising computer-executable instructions for performing the acts of:

receiving a request for content available at the content server;

sending the request to the network;

receiving the requested content from the network; and sending the received content to the mobile client.

31. A computer program product as recited in claim 30 wherein the content available at the content server comprises email content.

32. A computer program product as recited in claim 30 wherein the one or more access privileges included within the trust relationship that exists between the mobile authentication credentials and the other authentication credentials comprise a delegate access permission.

33. A computer program product as recited in claim 23 wherein the mobile client includes one or more identified wireless application protocol servers providing mobile gateway and content server access to one or more other mobile clients, the method further comprising computer-executable instructions for performing the act of accepting authentication credentials only from the one or more identified wireless application protocol servers.

34. A method as recited in claim 2, wherein changing the domain includes at least one of substituting one domain for another domain by replacing a domain specified by the mobile client; altering a domain name specified by the mobile client; or adding a domain.

35. A method as recited in claim 1, wherein the password comprises a numeric PIN entered by the wireless client.

36. A method as recited in claim 1, wherein the password is a password entered by the wireless client and wherein different authentication credentials must be provided by the wireless client to access different resources at the content server.

\* \* \* \* \*